United States Patent
Taipale et al.

(10) Patent No.: US 8,126,091 B2
(45) Date of Patent: Feb. 28, 2012

(54) RDS/RBDS DECODER WITH RELIABLE VALUES

(75) Inventors: Dana Taipale, Austin, TX (US); Gerald Champagne, Buda, TX (US)

(73) Assignee: Silicon Laboratories Inc., Austin, TX (US)

( * ) Notice: Subject to any disclaimer, the term of this patent is extended or adjusted under 35 U.S.C. 154(b) by 676 days.

(21) Appl. No.: 12/241,275

(22) Filed: Sep. 30, 2008

(65) Prior Publication Data

US 2010/0080326 A1    Apr. 1, 2010

(51) Int. Cl.
H04L 27/06    (2006.01)

(52) U.S. Cl. ........ 375/340; 375/224; 375/259; 375/260; 375/324; 375/326; 375/329; 375/333; 375/343

(58) Field of Classification Search ........... 375/296, 375/340, 224, 259, 260, 324, 326, 329, 333; 370/203, 206, 343; 455/102, 333, 337, 341, 455/436
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 6,017,146 A | * | 1/2000 | Masumoto et al. | 714/780 |
| 6,256,359 B1 | | 7/2001 | Masumoto et al. | 375/333 |
| 7,340,230 B2 | | 3/2008 | Khoini-Poorfard et al. | 455/132 |
| 7,864,893 B2 | | 1/2011 | Taipale et al. | 375/329 |
| 7,912,421 B2 | * | 3/2011 | Olgen | 455/3.06 |

FOREIGN PATENT DOCUMENTS

| | | |
|---|---|---|
| EP | 0714184 A2 | 5/1996 |
| EP | 0746112 A2 | 12/1996 |
| EP | 0902564 A1 | 3/1999 |

OTHER PUBLICATIONS

National Radio Systems Committee, "NRSC-4-A United States RBDS Standard, Specification of the radio broadcast data system", Apr. 2005, pp. 1-76. >>http://www.nrscstandards.org<<, NAB: 1771 N. St. NW, Washington, DC 20036.
International Patent Application No. PCT/US2008/070765, "*International Search Report*," international filing date Jul. 22, 2008.

* cited by examiner

Primary Examiner — Dhaval Patel
(74) Attorney, Agent, or Firm — O'Keefe, Egan, Peterman & Enders, LLP

(57) ABSTRACT

A method is provided that contemplates including filtered decode values in an RDS/RBDS output signal. The filtered decode values are generated from reliable values. The reliable values are generated from corresponding received values from each of at least two groups of RDS/RBDS data in an RDS/RBDS input signal. The method also comprises preventing an error correction code (ECC) unit from modifying the filtered decode values in the RDS/RBDS output signal.

20 Claims, 8 Drawing Sheets

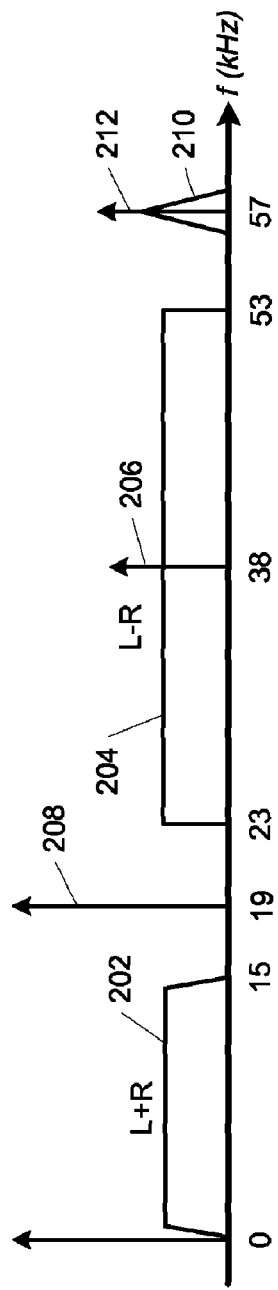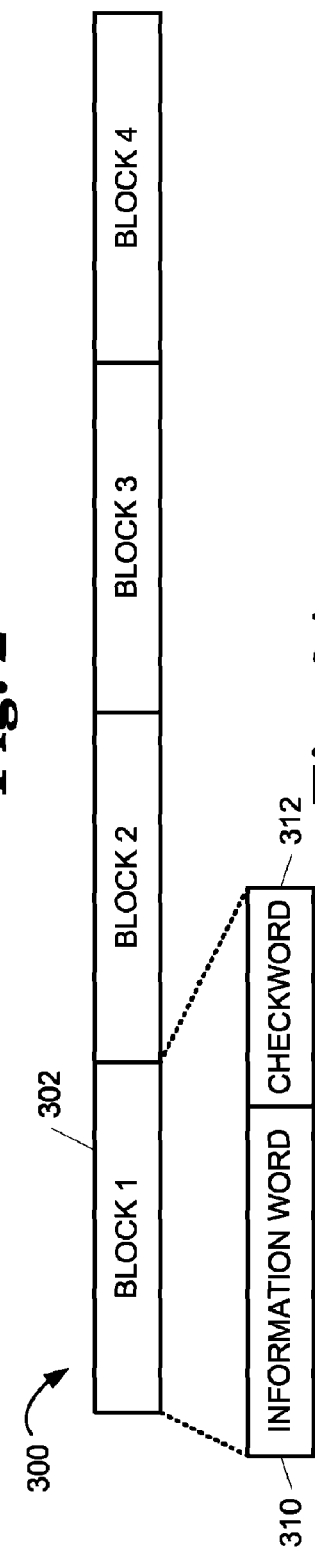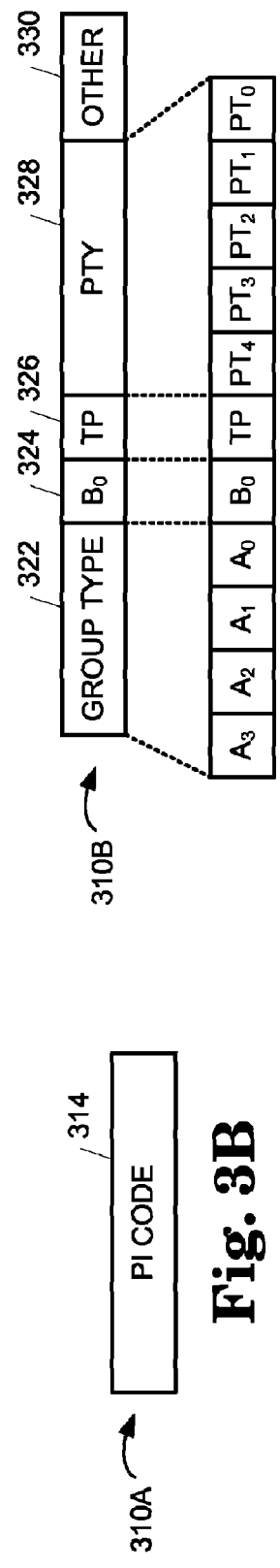

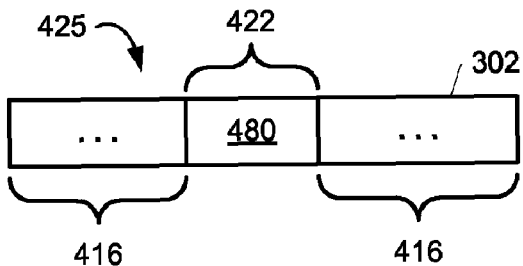
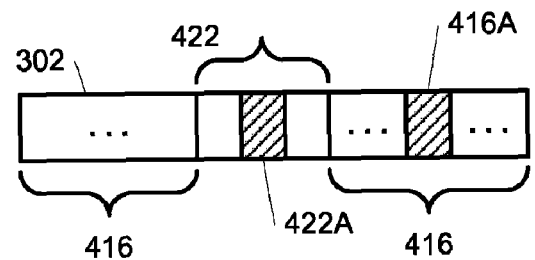
Fig. 5A　　　　　　　Fig. 5B
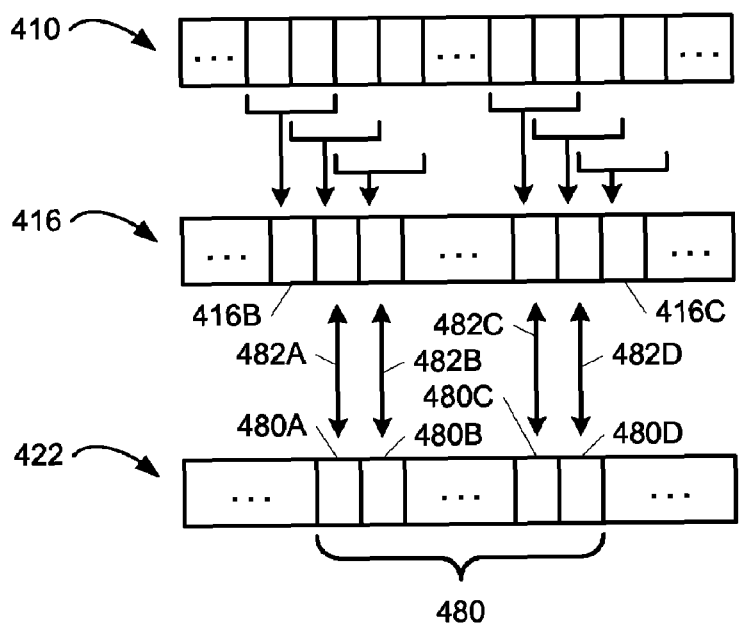
Fig. 5C
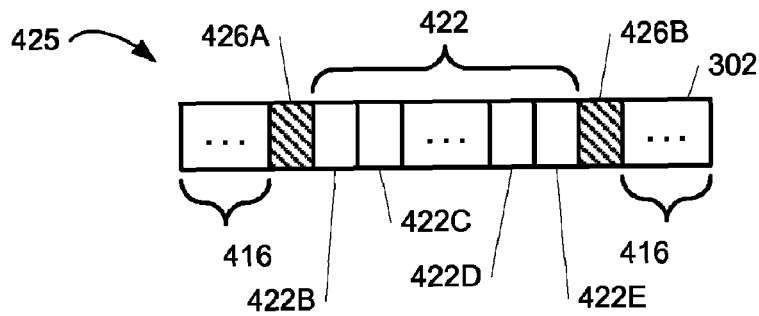
Fig. 5D

RDS/RBDS DECODER WITH RELIABLE VALUES

CROSS-REFERENCE TO RELATED APPLICATION

This application is related to U.S. patent application Ser. No. 11/828,248, filed on Jul. 25, 2007, entitled DECODER WITH SOFT DECISION COMBINING which is assigned to the assignee of the present invention and is incorporated by reference herein.

BACKGROUND

Radio frequency (RF) receivers are used in a wide variety of applications such as cellular or mobile telephones, cordless telephones, personal digital assistants (PDAs), computers, radios and other devices that transmit or receive RF signals. RF receivers may be used to receive RDS (Radio Data System) and/or RBDS (Radio Broadcast Data System) information that is transmitted along with an AM or FM broadcast. Such RF receivers may display the RDS/RBDS data, which may include the name of a broadcast station and a description of broadcast content, for example, to a user.

RDS/RBDS data is generally transmitted with a relatively low amount of power. Because of the low power transmission, noise may interfere with an RDS/RBDS signal so that the bit-energy-to-noise-density ratio (Eb/N0) of RDS/RBDS data in an RDS/RBDS signal is relatively low. The low bit-energy-to-noise-density ratio may make the information difficult to reliably decode. It would be desirable to increase the reliability of decoded RDS/RBDS data.

SUMMARY

According to one exemplary embodiment, a method is provided that contemplates including filtered decoder input values in an RDS/RBDS output signal. The filtered decode values are generated from reliable values. The reliable values are generated from corresponding received values from each of at least two groups of RDS/RBDS data in an RDS/RBDS input signal. The method also comprises preventing an error correction code (ECC) unit from modifying the filtered decode values in the RDS/RBDS output signal.

In another exemplary embodiment, program product is provided that includes a program and a medium that stores the program so that the program is accessible by processing circuitry. The program is executable by the processing circuitry for causing the processing circuitry to include filtered decode values in an RDS/RBDS output signal and prevent an error correction code (ECC) unit from modifying the filtered decode values in the RDS/RBDS output signal.

In further exemplary embodiment, a system is provided that includes a receiver and a host. The receiver is configured to include filtered decode values in an RDS/RBDS output signal. The receiver is configured to prevent an error correction code (ECC) unit from modifying the filtered decode values in the RDS/RBDS output signal and provide the RDS/RBDS output signal to the host.

BRIEF DESCRIPTION OF THE DRAWINGS

FIG. 2 is a graphical diagram illustrating one embodiment of a baseband spectrum for an FM stereo broadcast.

FIGS. 3A-3C are block diagrams illustrating embodiments of RDS/RBDS baseband coding structures.

FIGS. 5A-5D are block diagrams illustrating embodiments of decoded blocks of RDS/RBDS data.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As described herein, a receiver is provided for use in receiving radio-frequency (RF) signals or signals from other frequency bands. The receiver includes an RDS/RBDS decoder that is configured to decode and output RDS (Radio Data System) and/or RBDS (Radio Broadcast Data System) information. The receiver receives RDS/RBDS data in groups with a predefined number of bits (e.g., 104 bits) as provided by the RDS and RBDS standards.

The RDS/RBDS decoder combines corresponding values from multiple groups of a received RDS/RBDS signal to form a set of combined values. Each of the values used to generate the set of combined values has a magnitude and a sign determined from a respective pair of corresponding symbols in the received RF signal. The RDS/RBDS decoder identifies one or more subsets of reliable values in the set the combined values and uses the subsets to increase the accuracy of decoding the RDS/RBDS signal. For example, the RDS/RBDS decoder may use the subsets of reliable values to generate part of decoded blocks in the RDS/RBDS signal, may prevent an error correction code unit from modifying reliable portions of decoded blocks in the RDS/RBDS signal, and may correct decoded bits in decoded blocks in the RDS/RBDS signal that are adjacent to bits generated from the subsets of reliable values.

The receivers described herein may be used in a wide variety of integrated communications systems. Although terrestrial RF receivers, e.g., FM and AM receivers, are described herein, these receivers are presented by way of example. In other embodiments, other frequency bands may also be used.

Figure 1A:
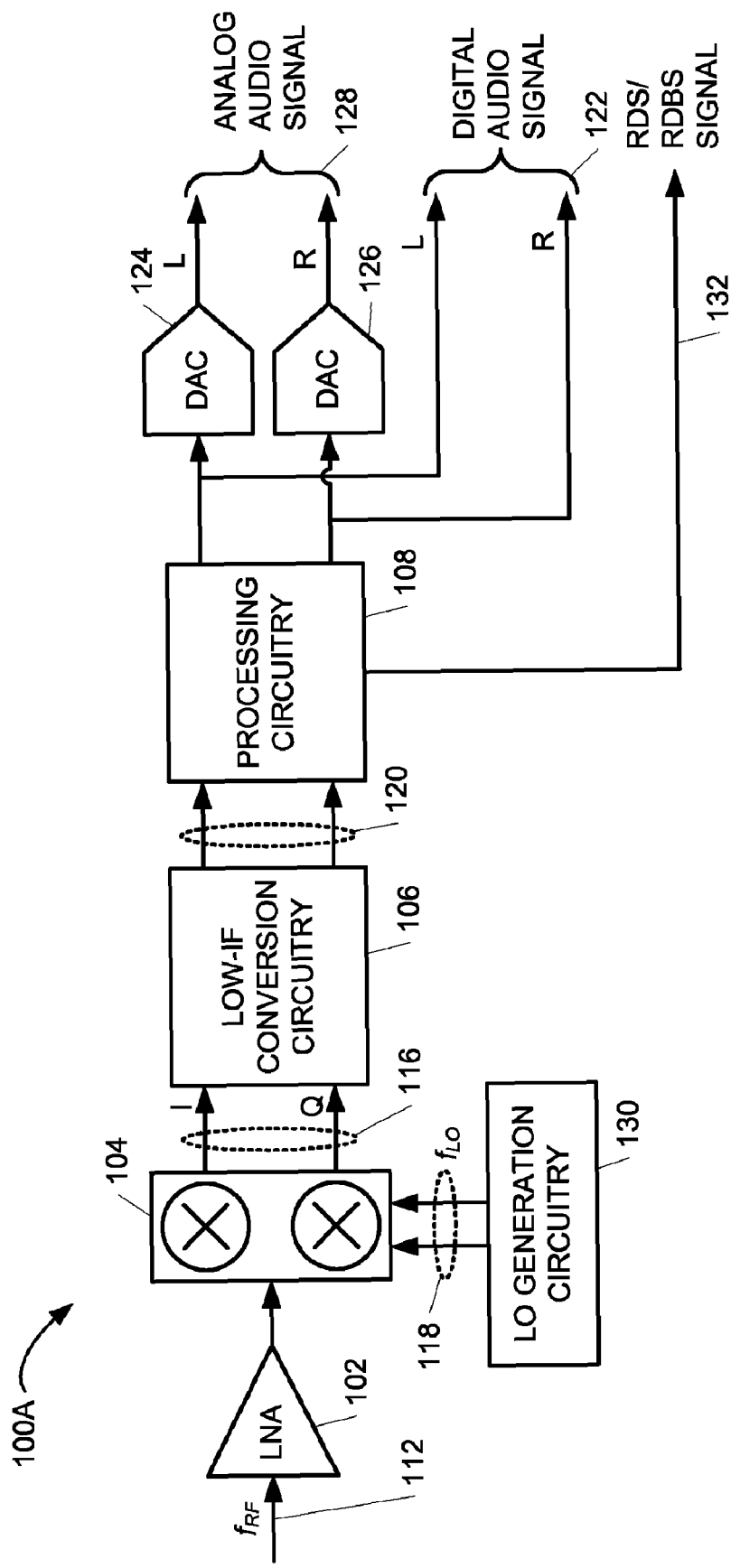
FIGS. 1A-1C are block diagrams illustrating embodiments of a low intermediate frequency (low-IF) receiver.

FIG. 1A is a block diagram illustrating an embodiment 100A of a low intermediate frequency (low-IF) receiver 100. Receiver 100A includes a low noise amplifier (LNA) 102, a mixer 104, low intermediate frequency (IF) conversion circuitry 106, processing circuitry 108, digital-to-analog converters 124 and 126, and local oscillator generation circuitry 130.

Receiver 100A is configured to receive a radio-frequency (RF) signal 112 and process signal 112 to generate a digital audio signal 122 and an analog audio signal 128 using a low intermediate frequency (IF) architecture. In one embodiment, receiver 100A forms an integrated terrestrial broadcast receiver configured to receive radio-frequency (RF) signals. As used herein, an RF signal means an electrical signal conveying useful information and having a frequency from about 3 kilohertz (kHz) to thousands of gigahertz (GHz), regardless of the medium through which the signal is conveyed. Thus, an RF signal may be transmitted through air, free space, coaxial cable, and/or fiber optic cable, for example. Accordingly, receiver 100A may receive signal 112 from a wired or wireless medium. In other embodiments, receiver 100A may be configured to receive signals 112 in another suitable frequency range.

In one embodiment, receiver 100A is configured as an AM/FM terrestrial broadcast receiver. In this embodiment, signal 112 includes the AM/FM terrestrial broadcast spectrum with a plurality of different AM and FM broadcast channels that are centered at different broadcast frequencies. In other embodiments, receiver 100A may be configured as a terrestrial broadcast receiver where signal 112 includes other terrestrial broadcast spectra with other channels.

LNA 102 receives RF signal 112 and generates an amplified output signal. The output of LNA 102 is then applied to mixer 104, and mixer 104 generates real (I) and imaginary (Q) output signals, as represented by signals 116. To generate low-IF signals 116, mixer 104 uses phase shifted local oscillator (LO) mixing signals 118. LO generation circuitry 130 includes oscillation circuitry (not shown) and outputs two out-of-phase LO mixing signals 118 that are used by mixer 104. The outputs of mixer 104 are at a low-IF which may be fixed or designed to vary, for example, if discrete step tuning for LO generation circuitry 130. An example of large step LO generation circuitry that utilizes discrete tuning steps is described in the co-owned and co-pending U.S. patent application Ser. No. 10/412,963, which was filed Apr. 14, 2003, which is entitled "RECEIVER ARCHITECTURES UTILIZING COARSE ANALOG TUNING AND ASSOCIATED METHODS," and which is hereby incorporated by reference in its entirety.

Low-IF conversion circuitry 106 receives the real (I) and imaginary (Q) signals 116 and outputs real and imaginary digital signals, as represented by signals 120. Low-IF conversion circuitry 106 preferably includes band-pass or low-pass analog-to-digital converter (ADC) circuitry that converts the low-IF input signals to the digital domain. Low-IF conversion circuitry 106 provides, in part, analog-to-digital conversion, signal gain, and signal filtering functions. Low-IF conversion circuitry 106 provides signals 120 to processing circuitry 108.

Processing circuitry 108 performs digital filtering and digital signal processing to further tune and extract the signal information from digital signals 120. Processing circuitry 108 produces baseband digital audio output signals 122. When the input signals relate to FM broadcasts, the digital processing provided by processing circuitry 108 may include, for example, FM demodulation and stereo decoding. Digital output signals 122 may include left (L) and right (R) digital audio output channels that represent the content of the FM broadcast channel being tuned. Processing circuitry 108 also provides the left and right digital audio output channels of signals 122 to DACs 124 and 126, respectively.

Processing circuitry 108 is further configured to generate and output RDS (Radio Data System) and/or RBDS (Radio Broadcast Data System) signals 132 from digital signals 120. RDS/RBDS signals 132 include RDS/RBDS data in a low data rate (e.g., 1187.5 bits/s) digital data stream that is transmitted at low deviation (e.g., ~2 kHz) along with target channel signals in the broadcast spectrum. RDS/RBDS data is transmitted and received in accordance with the international Radio Data System (RDS) standard IEC/CENELEC 62106 initially developed by the European Broadcasting Union (EBU) and/or the United States RBDS Standard, Specification of the radio broadcast data system (RBDS) published by the National Radio Systems Committee as NRSC-4-A and available from www.nrscstandards.org. Processing circuitry 108 tunes and decodes transmitted RDS/RBDS data from received digital signals 120 to generate the digital RDS/RBDS data stream. Processing circuitry 108 outputs the digital RDS/RBDS data stream as RDS/RBDS signal 132 either directly or across any suitable interface.

In processing RDS/RBDS data, processing circuitry 108 combines corresponding values from multiple groups of received RDS/RBDS data to form a set of combined values. Each of the values used to generate the set of combined values has a magnitude and a sign determined from a respective pair of corresponding symbols in digital signals 120. Processing circuitry 108 identifies one or more subsets of reliable values in the set the combined values and uses the subsets to increase the accuracy of decoding RDS/RBDS signal 132. Processing circuitry 108 uses the subsets of reliable values to generate part of decoded blocks in RDS/RBDS signal 132, prevents an error correction code unit from modifying reliable portions of decoded blocks in the RDS/RBDS signal 132, and/or corrects decoded bits in decoded blocks in RDS/RBDS 132 signal that are adjacent to bits generated from the subsets of reliable values.

DACs 124 and 126 receive the left and right digital audio output channels of signals 122, respectively, and convert digital signals 122 to analog audio output signals 128 with left and right analog audio output channels.

In other embodiments, the output of receiver 100A may be other desired signals, including, for example, low-IF quadrature I/Q signals from an analog-to-digital converter that are passed through a decimation filter, a baseband signal that has not yet be demodulated, multiplexed L+R and L−R audio signals, and/or any other desired output signals.

As used herein, low-IF conversion circuitry refers to circuitry that in part mixes the target channel within the input signal spectrum down to an IF that is equal to or below about three channel widths. For example, for FM broadcasts within the United States, the channel widths are about 200 kHz. Thus, broadcast channels in the same broadcast area are specified to be at least about 200 kHz apart. For the purposes of this description, therefore, a low IF frequency for FM broadcasts within the United States would be an IF frequency equal to or below about 600 kHz. It is further noted that for spectrums with non-uniform channel spacings, a low IF frequency would be equal to or below about three steps in the channel tuning resolution of the receiver circuitry. For example, if the receiver circuitry were configured to tune channels that are at least about 100 kHz apart, a low IF frequency would be equal to or below about 300 kHz. As noted above, the IF frequency may be fixed at a particular frequency or may vary within a low-IF ranges of frequencies, depending upon the LO generation circuitry utilized and how it is controlled.

For purposes of illustration, input signals 112 of receiver 100A described herein may be received in signal bands such as AM audio broadcast bands, FM audio broadcast bands, television audio broadcast bands, weather channel bands, or other desired broadcast bands. The following table provides example frequencies and uses for various broadcast bands that may be received by receiver 100A.

TABLE 1

EXAMPLE FREQUENCY BANDS AND USES

| FREQUENCY | | USES/SERVICES |
|---|---|---|
| 150-535 | kHz | European LW radio broadcast |
| | | 9 kHz spacing |
| 535-1700 | kHz | MW/AM radio broadcast |
| | | U.S. uses 10 kHz spacing |
| | | Europe uses 9 kHz spacing |
| 1.7-30 | MHz | SW/HF international radio broadcasting |
| 46-49 | MHz | Cordless phones, baby monitors, remote control |
| 59.75 (2) | MHz | U.S. television channels 2-6 (VHF_L) |
| 65.75 (3) | MHz | 6 MHz channels at 54, 60, 66, 76, 82 |
| 71.75 (4) | MHz | Audio carrier is at 5.75 MHz (FM MTS) |
| 81.75 (5) | MHz | |
| 87.75 (6) | MHz | |
| 47-54 (E2) | MHz | European television |
| 54-61 (E3) | MHz | 7 MHz channels, FM sound |
| 61-68 (E4) | MHz | Band I: E2-E4 |
| 174-181 (E5) | MHz | Band II: E5-E12 |
| 181-188 (E6) | MHz | |
| 188-195 (E7) | MHz | |
| 195-202 (E8) | MHz | |
| 202-209 (E9) | MHz | |
| 209-216 (E10) | MHz | |
| 216-223 (E11) | MHz | |
| 223-230 (E12) | MHz | |
| 76-91 | MHz | Japan FM broadcast band |
| 87.9-108 | MHz | U.S./Europe FM broadcast band |
| | | 200 kHz spacing (U.S.) |
| | | 100 kHz spacing (Europe) |
| 162.550 (WX1) | MHz | U.S. Weather Band |
| 162.400 (WX2) | MHz | 7 channels, 25 kHz spacing |
| 162.475 (WX3) | MHz | SAME: Specific Area Message Encoding |
| 162.425 (WX4) | MHz | |
| 162.450 (WX5) | MHz | |
| 162.500 (WX6) | MHz | |
| 162.525 (WX7) | MHz | |
| 179.75 (7) | MHz | U.S. television channels 7-13 (VHF_High) |
| 215.75 (13) | MHz | 6 MHz channels at 174, 180, 186, 192, 198, |
| | | 204, 210 FM Sound at 5.75 MHz |
| 182.5 (F5) | MHz | French television F5-F10 Band III |
| 224.5 (F10) | MHz | 8 MHz channels |
| | | Vision at 176, 184, 192, 200, 208, 216 MHz |
| | | AM sound at +6.5 MHz |
| 470-478 (21) | MHz | Band IV - television broadcasting |
| 854-862 (69) | MHz | Band V - television broadcasting |
| | | 6 MHz channels from 470 to 862 MHz |
| | | U.K. System I (PAL): |
| | | Offsets of +/−25 kHz may be used to alleviate co-channel interference |
| | | AM Vision carrier at +1.25 (Lower Sideband vestigial) |
| | | FMW Sound carrier at +7.25 |
| | | Nicam digital sound at +7.802 |
| | | French System L (Secam): |
| | | Offsets of +/−37.5 kHz may be used |
| | | AM Vision carrier at +1.25 (inverted video) |
| | | FMW Sound carrier at +7.75 |
| | | Nicam digital sound at +7.55 |
| 470-476 (14) | MHz | U.S. television channels 14-69 |
| 819-825 (69) | MHz | 6 MHz channels |
| | | Sound carrier is at 5.75 MHz (FM MTS) |
| | | 14-20 shared with law enforcement |

Figure 1B:
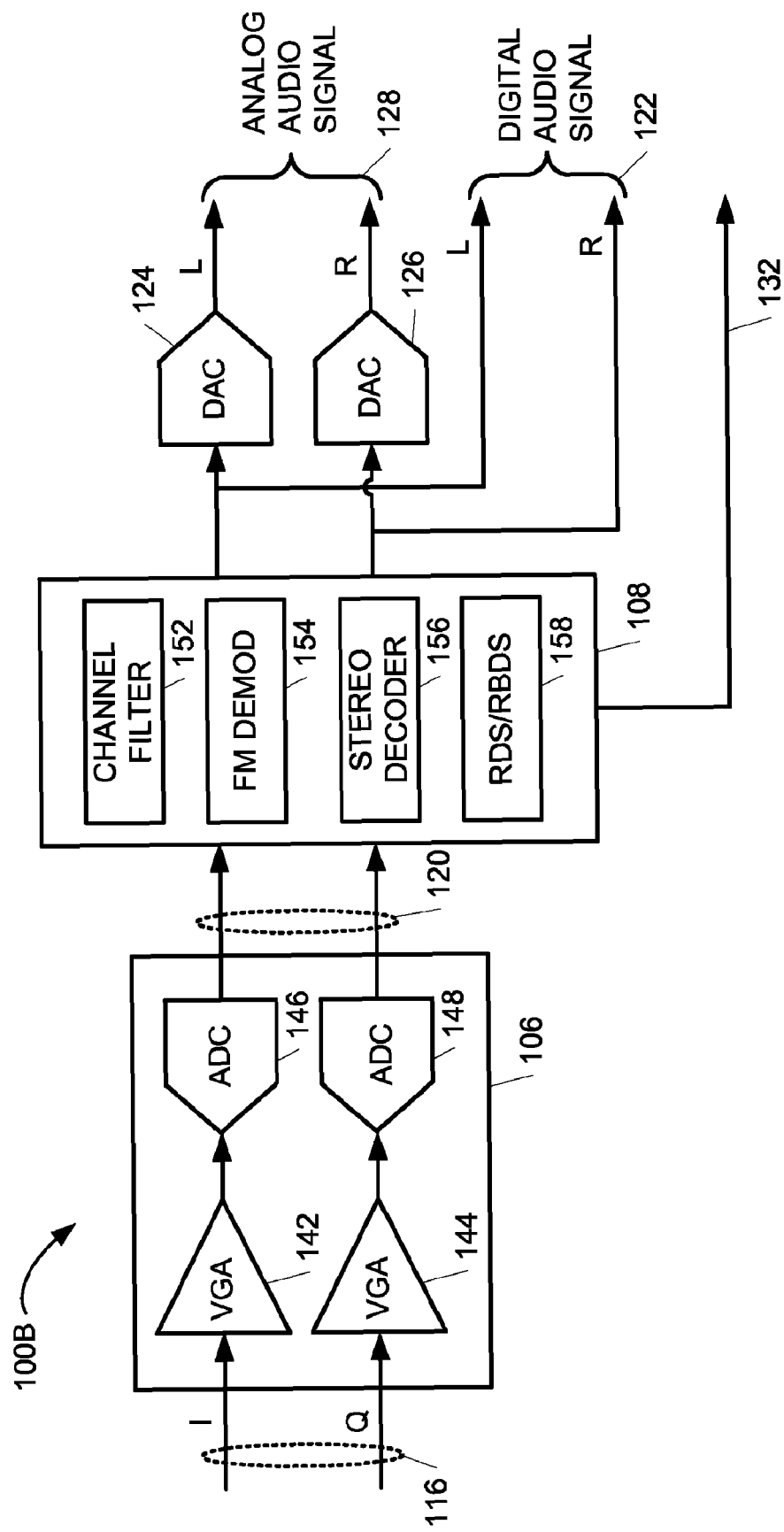

FIG. 1B is a block diagram illustrating an embodiment 100B of receiver 100. In receiver 100B, low-IF conversion circuitry 106 includes variable gain amplifiers (VGAs) 142 and 144 and analog-to-digital converters 146 and 148. Processing circuitry 108 includes an RDS/RBDS decoder 158.

VGAs 142 and 144 receive the real (I) and imaginary (Q) signals 116, respectively, that have been mixed down to a low-IF frequency by mixer 104 and amplify signals 116. Band-pass ADC 146 converts the output of VGA 142 from low-IF to the digital domain to produce the real (I) portion of digital output signals 120, and band-pass ADC 148 converts the output of VGA 144 from low-IF to the digital domain to produce the imaginary (Q) portion of digital output signals 120. In other embodiments, ADCs 146 and 148 may be implemented as complex band-pass ADCs, real low-pass ADCs, or any other desired ADC architecture.

Processing circuitry 108 receives signals 120 from ADCs 146 and 148 and digitally processes signals 120 to further tune the target channel using a channel selection filter 152. Processing circuitry 108 may also provide FM demodulation of the tuned digital signals using a FM demodulator 154 and stereo decoding, such as MPX decoding, using a stereo decoder 156. In addition, processing circuitry 108 tunes and decodes RDS/RBDS data using in part RDS/RBDS decoder 158 within processing circuitry 108. Processing circuitry 108 outputs left (L) and right (R) digital audio signals 122. Integrated DACs 124 and 126 convert digital audio signals 122 to left (L) and right (R) analog audio signals 128.

FIG. 2 is a graphical diagram illustrating one embodiment of a baseband spectrum 200 for an FM stereo broadcast target channel with left (L) and right (R) channels. In spectrum 200, a signal 202 from 30 Hz to 15 kHz includes the sum of the left and right stereo channels (L+R) and is transmitted as baseband audio. A signal 204 includes the difference between the left and right stereo channels (L-R). Signal 204 is amplitude-modulated onto a suppressed carrier 206 at 38 kHz to produce a double-sideband suppressed carrier (DSBSC) from 23 kHz to 53 kHz. A pilot tone 208 at 19 kHz is used by receiver 100B to generate carrier 206 with the correct phase. Spectrum 200 also includes an RDS/RBDS signal 210 from 55 kHz to 59 kHz and centered at a subcarrier 212 at 57 kHz (i.e., the third harmonic of pilot tone 208).

RDS/RBDS signal 210 represents a digital data stream of RDS/RBDS data. RDS/RBDS signal 210 is formed by differentially encoding the digital data stream using the encoding scheme shown in TABLE 1, converting differentially encoded signal to a biphase symbol signal, and mixing the biphase symbol signal with a 57 kHz subcarrier to form RDS/RBDS signal 210.

TABLE 1

| PREVIOUS OUTPUT (at time $t_{i-1}$) | CURRENT INPUT (at time $t_i$) | CURRENT OUTPUT (at time $t_i$) |
|---|---|---|
| 0 | 0 | 0 |
| 0 | 1 | 1 |
| 1 | 0 | 1 |
| 1 | 1 | 0 |

RDS/RBDS signal 210 is transmitted using an RDS/RBDS baseband coding structure as shown in the embodiment of FIG. 3A. The structure forms a group 300 of 104 bits with four blocks 302—blocks 1, 2, 3, and 4. Each of blocks 1, 2, 3, and 4 includes 26 bits where the first 16 bits form an information word 310 and the remaining 10 bits form a checkword 312 in each block 302. The bits of each group 300 are synchronously transmitted without gaps and the most significant bit of each block 302 is transmitted first.

As set forth in the RDS/RBDS standard, checkword 312 of block 1 uses a first offset word (offset word A), checkword 312 of block 2 uses a second offset word (offset word B), checkword 312 of block 3 uses a third offset word (offset word C or C'), and checkword 312 of block 4 uses a fourth offset word (offset word D). Because offset words A, B, C or C', and D may be used to identify blocks 1, 2, 3, and 4, respectively, blocks 1, 2, 3, and 4 may also be referred to as blocks A, B, C or C', and D, respectively. As set forth in the RDS/RBDS standard, each checkword 312 is the sum (modulo 2) of a) the remainder after multiplication by $x^{10}$ and then division (modulo 2) by the generator polynomial g(x), of the 16-bit information word 310, b) a 10-bit binary string d(x), called the "offset word", where the generator polynomial, g(x) is given by Equation I:

$$g(x)=x^{10}+x^8+x^7+x^5+x^4+x^3+1 \quad \text{Equation I}$$

and where the offset values, d(x), which are different for each block 302 within a group 300 are defined by the RBDS Standard.

As shown in FIG. 3B, information word 310A in block A includes a Program Identification (PI) code 314. PI code 314 is typically a constant value for a given broadcast with a given target channel. Accordingly, the same PI code 314 may appear in each block A of each received group 300 for relatively long periods of time (e.g., minutes, hours or days). For example, PI code 314 may not change until a user selects a different target channel (i.e., changes stations) or moves out of a broadcast area of a target channel.

As shown in FIG. 3C, information word 310B in block B includes a group type code 322 that includes bits $A_3$-$A_0$, a $B_0$ code 324, a traffic program (TP) code 326, a program type (PTY) code 328 that includes bits $PT_4$-$PT_0$, and a set of other bits 330. TP code 326 and PTY code 328 typically appear in every group 300 regardless of group type. As a result, the same TP code 326 and PTY code 328 may appear in each block B of each received group 300 over various periods of time.

Figure 4A:
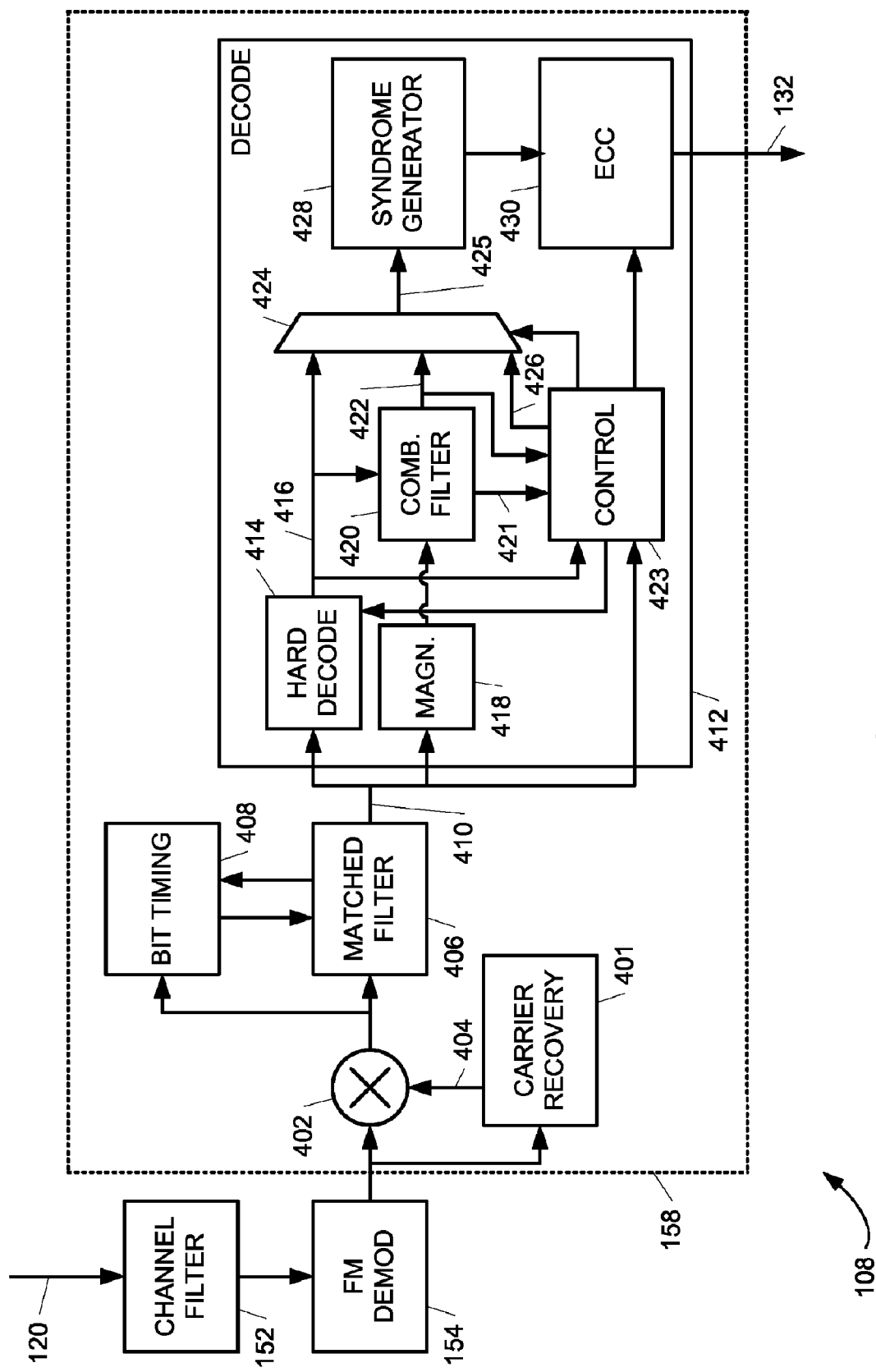
FIGS. 4A-4D are block diagrams illustrating embodiments of selected portions of an RDS/RBDS decoder.

FIG. 4A is a block diagram illustrating one embodiment of selected portions of RDS/RBDS decoder 158 in processing circuitry 108. RDS/RBDS decoder 158 operates by mathematically combining corresponding bits from two or more successive groups 300 of RDS/RBDS data. Because subsets of the bits of some blocks in each successive group may be constant over a given time period (e.g., PI code 314 in block A and TP code 326 and PTY code 328 in block B), RDS/RBDS decoder 158 can combine the corresponding bits so that the subsets become distinguishable from the bits of other blocks 302 that do not remain constant or at least as constant as the subsets over a given time period. RDS/RBDS decoder 158 uses the subsets to increase the accuracy of decoding RDS/RBDS signal 132.

Referring to FIG. 4A, channel selection filter 152 tunes the target channel of digital signals 120, and FM demodulator 154 performs FM demodulation on the tuned digital signals as noted above. FM demodulator 154 provides the tuned, demodulated signals to RDS/RBDS decoder 158.

In RDS/RBDS decoder 158, a carrier recovery unit 401 receives the output of FM demodulator 154 and generates a 57 kHz mixing signal 404. Mixer 402 mixes the output of FM demodulator 154 with mixing signal 404 to modulate the RDS/RBDS signals in the output of FM demodulator 154 down to DC. Mixer 402 provides the demodulated RDS/RBDS signals to a matched filter 406 and a bit timing unit 408. Matched filter 406 generates RDS/RBDS signals 410 by correlating the demodulated RDS/RBDS signals with an expected pulse using bit timing signals generated and provided by bit timing unit 408. Matched filter 406 provides RDS/RBDS signals 410 to a decode unit 412 and provides feedback to bit timing unit 408.

Referring to FIGS. 3A and 4A, RDS/RBDS signals 410 include a continuous stream of biphase symbols (i.e., positive or negative symbols) that are decodable into successive groups 300 of 104 bit values where the 104 bit values includes blocks A, B, C or C', and D with 26 bits each. The symbols of RDS/RBDS signals 410 are each nominally either +1 or −1 but, due to noise, signal strength, or other factors, may vary from the nominal values. Accordingly, each symbol is a real number with a sign and a magnitude and may be represented by a 16-bit value in one embodiment.

Figure 4B:
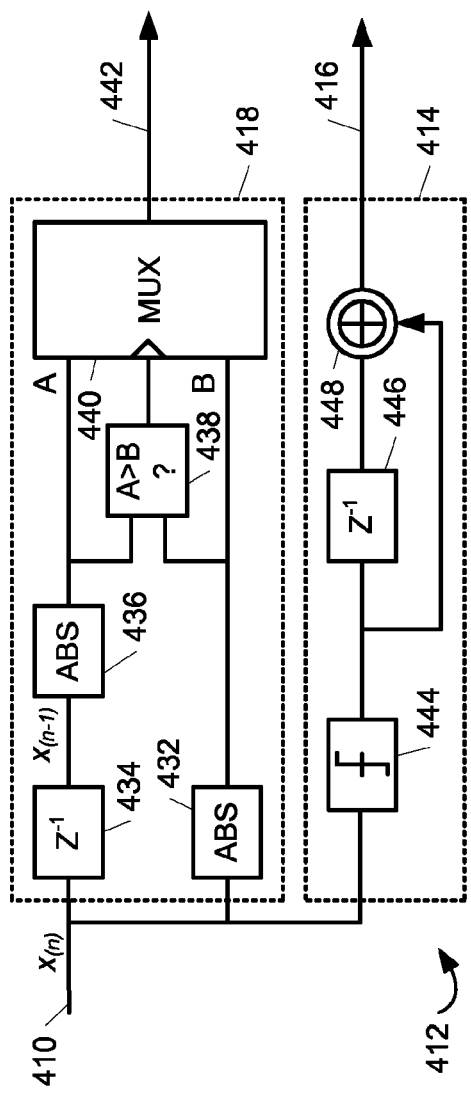

Decode unit 412 receives RDS/RBDS signals 410 from matched filter 406. A hard decode unit 414 performs differential decoding on signals 410 to obtain a sign value (i.e., positive or negative) from each adjacent pair of symbols in signals 410. A magnitude unit 418 determines a magnitude value from the magnitudes of the corresponding pair of symbols for each sign value. FIG. 4B is a block diagram illustrating embodiments of hard decode unit 414 and magnitude unit 418.

In the embodiment of FIG. 4B, hard decode unit 414 receives RDS/RBDS signals 410. Hard decode unit 414 generates a decoded sign value for each pair of symbols in RDS/RBDS signals 410 where the decoded sign values generated by hard decode unit 414 form hard decode signals 416. A level detect unit 444 converts the current symbol, $x_{(n)}$, to a value of 0 if $x_{(n)}$>0 and a value of 1 if $x_{(n)}$<=0. An exclusive OR (XOR) unit 448 performs an exclusive OR operation to implement the decoding scheme shown in Table 2 on the current symbol (i.e., the current output of level detect unit 444) and the previous symbol (i.e., the previous output level detect unit 444 provided by delay unit 444) to generate a decoded sign value.

TABLE 2

| PREVIOUS INPUT $x_{(n-1)}$ (at time $t_{i-1}$) | CURRENT INPUT $x_{(n)}$ (at time $t_i$) | CURRENT OUTPUT (at time $t_i$) |
| --- | --- | --- |
| 0 | 0 | 0 |
| 0 | 1 | 1 |
| 1 | 0 | 1 |
| 1 | 1 | 0 |

Magnitude unit 418 receives RDS/RBDS signals 410. Magnitude unit 418 generates a magnitude value for each pair of symbols in RDS/RBDS signals 410 where the magnitude values generated by magnitude unit 418 form magnitude signals 442. Magnitude unit 418 determines each magnitude value to be equal to the magnitude of the least reliable symbol of each adjacent pair of symbols of signals 410. Because the symbols of signals 410 nominally vary between +1 and −1, magnitude unit 418 determines the least reliable symbol to be the symbol with the lowest absolute value (i.e., the value that is closest to zero). An absolute value unit 432 determines the absolute value of a current symbol, $x_{(n)}$. A delay unit 434 provides the previous symbol, $x_{(n-1)}$ to an absolute value unit 436 to determine the absolute value of the previous symbol, $x_{(n-1)}$. A comparator unit 438 compares the absolute values of the current and the previous symbols and causes the lesser one to be provided by multiplexor 440 as a magnitude value in magnitude signals 442.

Referring back to FIG. 4A, a combining filter 420 forms a current combined value from the magnitude value and decoded sign value for each pair of symbols in RDS/RBDS signals 410 and combines the current combined value with one or more corresponding previous combined values. Because each group 300 includes 104 bits, the previous combined values that correspond to a current combined value were previously received at integer multiples of 104 bits. Accordingly, combining filter 420 combines the current combined value with the (1×104)th to (p×104)th previous combined values where p is greater than or equal to one.

Combining filter 420 combines the combined values in any suitable way that causes subsets of relatively constant combined values (e.g, the subset of combined values corresponding to PI code 314 in block A or the subset of combined values corresponding to TP code 326 and/or PTY code 328 in block B) to approach known values over time and causes sets of relatively non-constant combined values to not approach the known values. For example, combining filter 420 may combine each set of two or more corresponding combined values by filtering or averaging each set such that each set of relatively constant combined values approaches +1 or −1 and each set of relatively non-constant combined values does not approach +1 or −1 (e.g., each set of relatively non-constant combined values approaches 0). By causing the combined values to approach known values, combining filter 420 may identify subsets of consecutive combined values that each approach one of the known values.

Figure 4D:
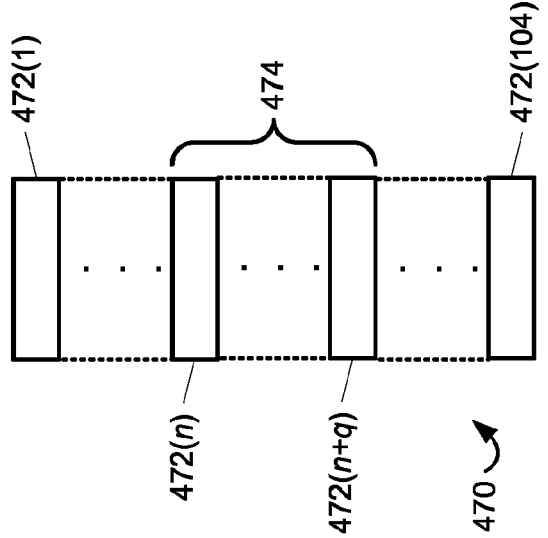
Figure 4C:
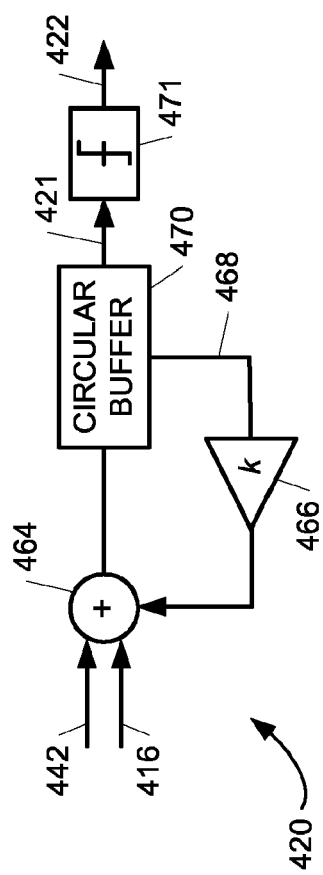

FIG. 4C is a block diagram illustrating one embodiment of combining filter 420. In combining filter 420, a summation unit 464 adds the current combined value (i.e., a value with the magnitude of magnitude value 442 and sign of the decoded sign value 416) to a previous combined value 468 that is multiplied by a factor of k (e.g., k=0.9) by a filter unit 466. Summation unit 464 outputs a combined value to a circular buffer 470.

Circular buffer 470 stores each combined value in a corresponding entry 472. As shown in the embodiment of FIG. 4D, circular buffer 470 includes a set of entries 472(1)-472(104) for storing the combined values that correspond to the 104 bits of each received group 300. Because each previous combined value 468 is generated from all previous combined values in the embodiment of FIG. 4C, combining filter 420 generates each combined value using all corresponding previous combined values in this embodiment. Circular buffer 470 outputs combined values as combined values signals 421 to a level detect unit 471.

Level detect unit 471 converts each combined value CV to a filtered decode value of 0 if CV>0 and a filtered decode value of 1 if CV<=0. Level detect unit 471 outputs the filtered decode values as filtered decode signals 422.

Referring back to FIG. 4A, RDS/RBDS decoder 158 identifies one or more subsets 474 of reliable values in the set the combined values from circular buffer 470 and uses the subsets 474 to increase the accuracy of RDS/RBDS signal 132. RDS/RBDS decoder 158 identifies each entry 472 in circular buffer 470 that approaches a known value over time (e.g., +1 or −1) as a reliable value. In the example shown in FIG. 4D, RDS/RBDS decoder 158 identifies a subset 474 of consecutive entries 472($n$) to 472($n+q$), where n is an integer from 1 to 104 that represents the nth entry 472 and q is an integer offset from n, as approaching a known value over time and designates subset 474 as a subset of reliable values. RDS/RBDS decoder 158 may identify any number of subsets 474 of reliable values in circular buffer 470 and the number of subsets 474 in circular buffer 470 may change over time. For example, RDS/RBDS decoder 158 may identify a first subset 474 that corresponds to PI code 314 in information word 310A in block A (FIG. 3B) and a second subset 474 that corresponds to TP code 326 and PTY code 328 in information word 310B in block B (FIG. 3C).

RDS/RBDS decoder 158 may use filtered decode signals 422 corresponding to subsets 474 of reliable values as part of decoded blocks 302 in RDS/RBDS signal 132. Because the subsets 474 of reliable values are generated from multiple received groups 300 of RDS/RBDS data, RDS/RBDS decoder 158 may consider filtered decode signals 422 that correspond to the subsets 474 as more reliable than hard decode signals 416 which are generated from a single received group 300 of RDS/RBDS data.

RDS/RBDS decoder 158 includes a multiplexor 424 that receives hard decode signals 416, filtered decode signals 422, and, as described in additional detail below, correction signals 426. A control unit 423 provides a selection signal to multiplexor 424 that selects one of hard decode signals 416, filtered decode signals 422, and correction signals 426 to be included as decoded signals 425 that are output by multiplexor 424 to a syndrome generator 428.

Control unit 423 receives combined values signals 421 and identifies subsets 474 of reliable values using combined values signals 421. Control unit 423 generally provides the control signals to multiplexor 424 to cause hard decode signals 416 to be included in decoded signals 425. For each subset 474 of reliable values, however, control unit 423 causes filtered decode signals 422 corresponding to the subset 474 to be included in decoded signals 425 in place of the corresponding hard decode signals 416 as shown in FIG. 5A. FIG. 5A is an embodiment of a decoded block 302 in decoded signals 425. Decoded block 302 includes a set of one or more bit values 480 from filtered decode signals 422 where bit values 480 correspond to a subset 474 of reliable values. Control unit 423 causes the bit values 480 to be substituted for the corresponding values from hard decode signals 416. The remainder of decoded block 302 includes bit values from hard decode signals 416.

For example, control unit 423 may cause a first set of bit values 480 that form PI code 314 in information word 310A in block A (FIG. 3B) to be included in a first decoded block 302. Control unit 423 may cause a second et of bit values 480 that form TP code 326 and PTY code 328 in information word 310B in block B (FIG. 3C) to be included in a second decoded block 302.

Syndrome generator 428 calculates a syndrome for each block 302 in decoded signals 425 and provides the syndrome and corresponding block 302 to an error correction code (ECC) unit 430. ECC unit 430 identifies and corrects errors in each block 302 of RDS/RBDS data using the syndrome as described in the RDS/RBDS standards. ECC unit 430 provides each block 302 with corrected errors in RDS/RBDS signals 132.

RDS/RBDS decoder 158 also uses combined values signals 421 indicates reliabilities of portions of decoded blocks 302 in RDS/RBDS signal 132 to ECC unit 430. ECC unit 430 may detect possible errors in blocks 302 in both portions of blocks 302 from hard decode signals 416 and portions of blocks 302 from filtered decode signals 422. Because RDS/RBDS decoder 158 considers portions of blocks 302 from filtered decode signals 422 to be reliable, RDS/RBDS decoder 158 may prevent ECC unit 430 from modifying portions of blocks 302 from filtered decode signals 422, and possibly portions of blocks 302 from hard decode signals 416, when ECC unit 430 detects possible errors in blocks 302. By doing so, RDS/RBDS decoder 158 makes the assessment that the portions of blocks 302 from filtered decode signals 422 are most likely correct and that ECC unit 430 has likely detected possible errors incorrectly. Accordingly, RDS/RBDS decoder 158 may prevent ECC unit 430 from incorrectly modifying blocks 302.

Control unit 423 provides reliable signals to ECC unit 430 that identify reliable portions of blocks 302 (i.e., portions of blocks 302 from filtered decode signals 422). In response to the reliable signals, ECC unit 430 does not modify reliable portions of blocks 302 as shown in FIG. 5B. FIG. 5B is an embodiment of a decoded block 302 provided to ECC unit 430. In the example of FIG. 5B, ECC unit 430 detects a possible error 422A in a portion of block 302 from filtered decode signals 422 and a possible error 416A in a portion of block 302 from hard decode signals 416. ECC unit 430 recognizes that possible error 422A is in a portion of block 302 from filtered decode signals 422 from the reliable signals from control unit 423 and does not modify the value of possible error 422A. ECC unit 430 also recognizes that error 416A is in a portion of block 302 from hard decode signals 416 (i.e., a portion of block 302 not indicated as reliable from the reliable signals from control unit 423) and may modify possible error 422A as specified in the RDS/RBDS standards. In one embodiment, RDS/RBDS decoder 158 may prevent ECC unit 430 from modifying any portion of a block 302 (including portions from hard decode signals 416) that includes a portion from filtered decode signals 422. In other embodiments, RDS/RBDS decoder 158 may allow ECC unit 430 to modify portions of a block 302 from hard decode signals 416 that include a possible error. By not modifying at least reliable portions of blocks 302, RDS/RBDS decoder 158 may reduce the number of instances where RDS/RBDS decoder 158 outputs incorrect information words 312 in RDS/RBDS signal 132.

For example, where control unit 423 identifies a first subset 474 of reliable values that correspond to PI code 314 in information word 310A in block A (FIG. 3B), control unit 423 causes ECC unit 430 not to modify a portion of a first block 302 from filtered decode signals 422 that correspond to PI code 314. Similarly, where control unit 423 identifies a second subset 474 of reliable values that correspond to TP code 326 and PTY code 328 in information word 310B in block B (FIG. 3C), control unit 423 causes ECC unit 430 not to modify a portion of a second block 302 from filtered decode signals 422 that correspond to TP code 326 and PTY code 328.

RDS/RBDS decoder 158 may further correct decoded sign values in hard decode signals 416 that are adjacent to bits generated from subsets 474 of reliable values. Because hard decode unit 414 generates each decoded sign value in hard decode signals 416 from a pair of adjacent symbols in RDS/RBDS signals 410, an unreliable symbol (e.g., a noisy symbol) may cause hard decode unit 414 to generate a pair of adjacent decoded sign values incorrectly. When one of these pair of adjacent decoded sign values is adjacent to a bit generated from a subset 474 of reliable values, RDS/RBDS decoder 158 may discern that the decoded sign value in hard decode signals 416 that corresponds to the bit that is adjacent to a bit generated from a subset 474 of reliable values and correct the decoded sign value.

In one embodiment, RDS/RBDS decoder 158 examines symbols in RDS/RBDS signals 410 that correspond to decoded sign values in hard decode signals 416 that are adjacent to bits generated from subsets 474 of reliable values. Control unit 423 detects when a symbol that is used to generate both a decoded sign value in hard decode signals 416 and a bit from a subset 474 of reliable values is unreliable (e.g., by determining that the symbol is the least reliable of one or both of the pair of symbols). Control unit 423 provides a signal hard decode signals 416 to cause the sign of the unreliable symbol to be changed (e.g, from positive to negative or from negative to positive) to correct the unreliable symbol and cause the decoded sign value in hard decode signals 416 to be corrected.

In another embodiment, RDS/RBDS decoder 158 examines combined values signals 421 to correct decoded sign values in hard decode signals 416 that are adjacent to bits generated from subsets 474 of reliable values as shown in FIGS. 5C and 5D. FIG. 5C is an embodiment illustrating symbols in RDS/RBDS signals 410, bits in hard decode signals 416, and bits in filtered decode signals 422. Control unit 423 identifies a set of bits 480 in filtered decode signals 422 as corresponding to a subset 474 of reliable values. Control 423 uses the two pairs of outermost bits from the set of bits 480 (i.e., the pair of bits 480A and 480B and the pair of bits 480C and 480D) to determine whether bits 416B and 416C in hard decode signals 416 are likely incorrect.

For bit 416B, control 423 determines whether bit 480A is not equal to the corresponding bit in hard decode signals 416 as indicated by an arrow 482A. If the bits are not equal, then one of the two symbols used to generate the bit in hard decode signals 416 that corresponds to bit 480A was likely received by or interpreted by RDS/RBDS decoder 158 incorrectly. To determine which symbol was likely incorrect, control 423 determines whether bit 480B is equal to the corresponding bit in hard decode signals 416 as indicated by an arrow 482B. If these two bits are equal, then the likely incorrect symbol is the one that was used to generate bit 416B and the bit subsequent to bit 416B (i.e., the bit in hard decode signals 416 that corresponds to bit 480A). Accordingly, control 423 corrects bit 416B by causing a corrected bit 426A to be included in decoded signals 425 in place of bit 416B as shown in FIG. 5D.

If bit 480B is equal to the corresponding bit in hard decode signals 416, then the likely incorrect symbol is the one that was used to generate the two bits subsequent to bit 416B (i.e., the bits in hard decode signals 416 that correspond to bits 480A and 480B). In this case, control 423 does not determine the correctness of bit 416B from 480A and 480B and assumes that bit 416B is correct. Accordingly, control 423 causes bit 416B to be included in decoded signals 425 (not shown).

For bit 416C, control 423 determines whether bit 480D is not equal to the corresponding bit in hard decode signals 416 as indicated by an arrow 482D. If the bits are not equal, then one of the two symbols used to generate the bit in hard decode signals 416 that corresponds to bit 480D was likely received by or interpreted by RDS/RBDS decoder 158 incorrectly. To determine which symbol was likely incorrect, control 423 determines whether bit 480C is equal to the corresponding bit in hard decode signals 416 as indicated by an arrow 482C. If these two bits are equal, then the likely incorrect symbol is the one that was used to generate bit 416C and the bit prior to bit 416C (i.e., the bit in hard decode signals 416 that corresponds to bit 480D). Accordingly, control 423 corrects bit 416C by causing a corrected bit 426B with a value that is opposite of bit 416C to be included in decoded signals 425 in place of bit 416C as shown in FIG. 5D.

If bit 480C is equal to the corresponding bit in hard decode signals 416, then the likely incorrect symbol is the one that was used to generate the two bits prior to bit 416C (i.e., the bits in hard decode signals 416 that correspond to bits 480C and 480D). In this case, control 423 does not determine the correctness of bit 416C from 480C and 480D and assumes that bit 416C is correct. Accordingly, control 423 causes bit 416C to be included in decoded signals 425 (not shown).

For example, where control unit 423 identifies a subset 474 of reliable values that correspond to TP code 326 and PTY code 328 in information word 310B in block B (FIG. 3C), control unit 423 may cause $B_0$ code 324 and/or the first bit in the set of other bits 330 to be corrected.

Referring back to FIG. 4A, syndrome generator 428 may also use combined values signals 421 received from combining filter 410 (not shown) to detect synchronization of RDS/RBDS decoder 158. Each time a combined value is stored in circular buffer 470 and provided to syndrome generator 428, syndrome generator 428 may calculate a syndrome using the signs of the set of the 26 combined values that include the new combined value and the 25 previous combined values. Syndrome generator 428 may calculate a syndrome by multiplying the set of 26 combined values by a parity-check matrix as described by the RDS/RBDS standards. For example in FIG. 4D, syndrome generator 428 calculates a syndrome using a set of 26 combined values from entries 472($n$−25) to 472($n$) in response to a new combined value being stored in entry 472($n$) of circular buffer 470.

If the syndrome corresponds to a valid block A checkword 312, then syndrome generator 428 declares synchronization and identifies the subset of entries 472($n$−25) to 472($n$) in circular buffer 470 as including block A. If the syndrome does not correspond to a valid block A checkword 312, then syndrome generator 428 continues to generate a new syndrome each time a new combined value is stored in circular buffer 470. With each set of additional combined values that are combined in circular buffer 470, the probability of identifying block A in circular buffer 470 increases. Once syndrome generator 428 determines that synchronization is achieved, syndrome generator 428 begins providing decoded blocks 302 and corresponding syndromes to ECC unit 430 as described above.

By combining corresponding values from multiple groups 300, RDS/RBDS decoder 158 may obtain or maintain synchronization when the RDS/RBDS signal is received at low or noisy signal levels. In some instances, RDS/RBDS decoder 158 may allow for an alternate frequency to be identified and tuned using the PI code in block A to overcome the low or noisy signal levels.

In the above embodiments, each combined value has a magnitude of the least reliable of the adjacent pair of symbols. The rationale for using the least reliable of the adjacent pair of symbols will now be described. Equation II describes the ideal combined value using the probabilities of each combination of nominal values (e.g., (1, 1), (−1, −1), (1, −1), and (−1, 1)) of current and previous symbol values, $x_{(n)}$ and $x_{(n-1)}$, and the noise σ on the current and previous symbols.

$$SoftDecision = \text{Ln}\left[\frac{e^{\frac{-(x_n-1)^2-(x_{n-1}+1)^2}{2\sigma^2}} + e^{\frac{-(x_n+1)^2-(x_{n-1}-1)^2}{2\sigma^2}}}{e^{\frac{-(x_n-1)^2-(x_{n-1}-1)^2}{2\sigma^2}} + e^{\frac{-(x_n+1)^2-(x_{n-1}+1)^2}{2\sigma^2}}}\right] \quad \text{Equation II}$$

$$= \text{Ln}\left[\frac{e^{\frac{-x_n^2-x_{n-1}^2-2}{2\sigma^2}}\left[e^{\frac{x_n-x_{n-1}}{2\sigma^2}} + e^{\frac{x_{n-1}-x_n}{2\sigma^2}}\right]}{e^{\frac{-x_n^2-x_{n-1}^2-2}{2\sigma^2}}\left[e^{\frac{x_n+x_{n-1}}{2\sigma^2}} + e^{\frac{-x_n-x_{n-1}}{2\sigma^2}}\right]}\right]$$

Equation II includes terms in the form of $e^z + e^{-z}$. Because $z>0$, $e^z >> e^{-z}$ so that $e^z + e^{-z} \approx e^z$. Equation III may be derived by removing the $e^{-z}$ terms and canceling terms in Equation II.

$$SoftDecision \approx \text{Ln}\left[\frac{e^{\frac{|x_n-x_{n-1}|}{2\sigma^2}}}{e^{\frac{|x_n+x_{n-1}|}{2\sigma^2}}}\right] \quad \text{Equation III}$$

$$= \frac{|x_n-x_{n-1}|}{2\sigma^2} - \frac{|x_n+x_{n-1}|}{2\sigma^2}$$

$$= \begin{cases} -\left(\frac{x_{n-1}}{\sigma^2}\right)\text{sgn}(x_n), & |x_n| > |x_{n-1}| \\ -\left(\frac{x_n}{\sigma^2}\right)\text{sgn}(x_{n-1}), & |x_{n-1}| > |x_n| \end{cases}$$

Assuming that the noise is constant over each block 302, the noise factor can be scaled away to derive Equation IV where MRS is the most reliable symbol of $x_{(n)}$ and $x_{(n-1)}$ and LRS is the least reliable symbol of $x_{(n)}$ and $x_{(n-1)}$.

$$SoftDecision \approx -\text{sgn}(MRS)*(LRS) \quad \text{Equation IV}$$

From Equation IV, the ideal combined value is proportional to the magnitude of the least reliable of the adjacent pair of symbols.

Figure 1C:
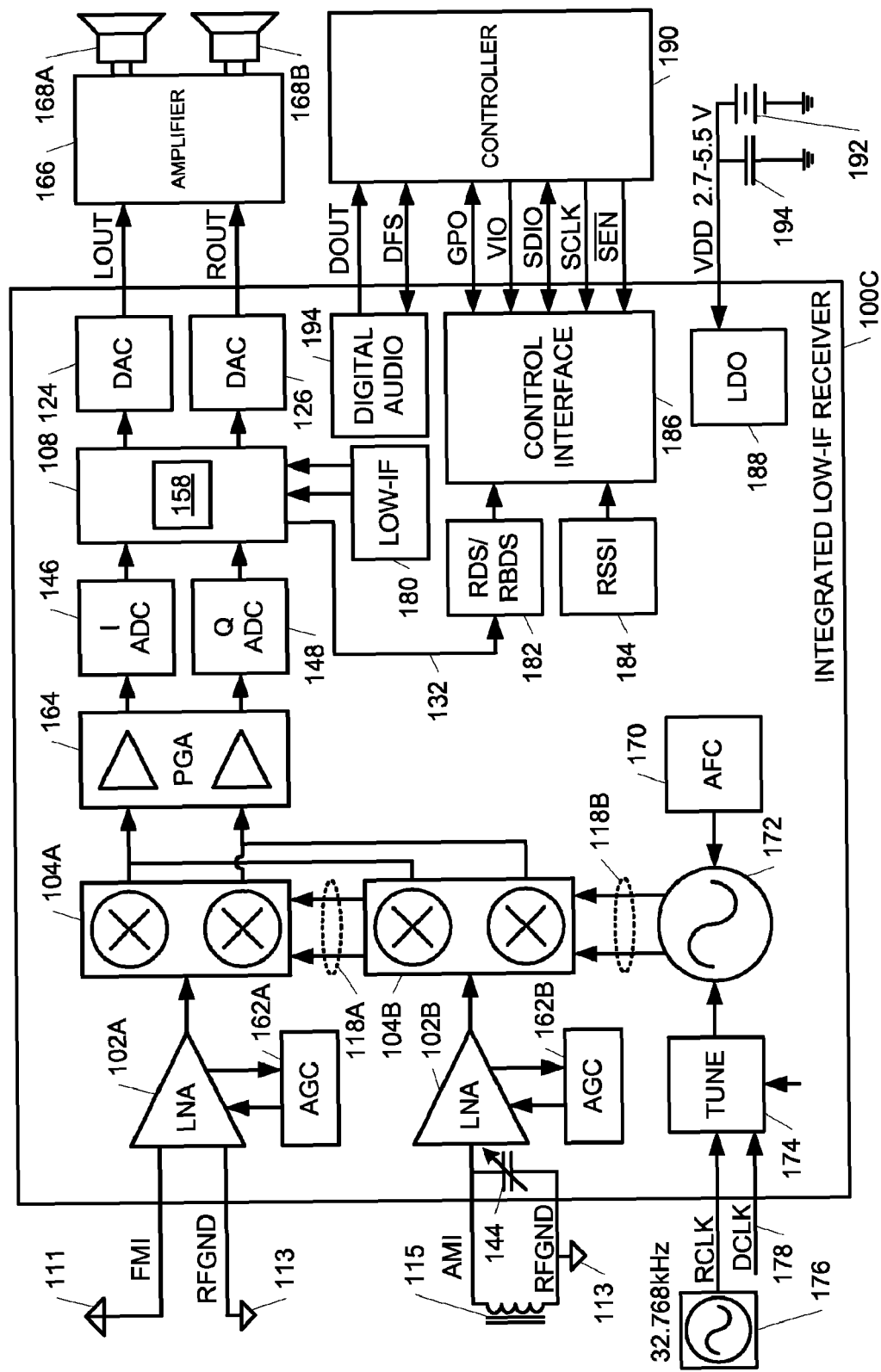

FIG. 1C is a block diagram illustrating an embodiment 100C of low-IF receiver 100. Receiver 100C forms an integrated terrestrial broadcast that is configured to receive FM and AM broadcasts. Receiver 100C includes an FM antenna 111 that provides a differential FM input signal, FMI, between antenna 111 and a ground connection, RFGND, 113, to an LNA 102A. Receiver 100C also includes an AM antenna 115 that provides a differential AM input signal, AMI, between antenna 115 and ground connection, RFGND, 113, to an LNA 102B. AM antenna 115 is a ferrite bar antenna, and the AM reception can be tuned using an on-chip variable capacitor circuit 144. FM antenna 111 reception may also be tuned with an on-chip variable capacitor circuit (not shown), if desired. An integrated supply regulator (LDO) block 188 regulates the on-chip power using a supply voltage, VDD (2.7-5.5 V), from a power supply 192 across a capacitor 194.

LNAs 102A and 102B operate in conjunction with automatic gain control (AGC) blocks 162A and 162B, respectively, and provide output signals to mixers 104A and 104B, respectively. Mixers 104A and 104B process the respective signals and each generate real (I) and an imaginary (Q) signals. Mixers 104A and 104B each provide the real (I) and an imaginary (Q) signals to a programmable gain amplifier (PGA) 164. Receiver 100C operates such that only one of mixers 104A and 104B provides signals to PGA 164 at a time. PGA 164 processes the signals from mixers 104A and 104B to generate output signals. The output signals from PGA 164 are then converted to digital I and Q values with I-path ADC 146 and Q-path ADC 148.

Processing circuitry 108 then processes the digital I and Q values to produce left (L) and right (R) digital audio output signals and provides the digital audio output signals to digital audio block 194. Digital audio block 194 provides the digital audio output signals (DOUT) to controller 190 and communicates with controller 190 using a DFS signal. In addition, these left (L) and right (R) digital audio output signals are processed by DAC circuits 124 and 126 to produce left (LOUT) and right (ROUT) analog output signals. These analog output signals are output to listening devices, such as headphones or speakers. Amplifier 166 and speaker outputs 168A and 168B, for example, may represent headphones or speakers for listening to the analog audio output signals. As described above, processing circuitry 108 provides a variety of processing features, including digital filtering, FM and AM demodulation (DEMOD) and stereo/audio decoding, such as MPX decoding. Low-IF block 180 includes additional circuitry utilized to control the operation of processing circuitry 108 in processing the digital I/Q signals.

Receiver 100C also includes a digital control interface 186 to communicate with external devices, such as controller 190. The digital communication interface between control interface 186 and controller 190 includes a bi-directional GPO signal, a VIO signal, a bi-directional serial data input/output (SDIO) signal, a serial clock input (SCLK) signal, and a serial interface enable (SEN_) input signal. In addition, control and/or data information is provided through interface 186 to and from external devices, such as controller 192. For example, a RDS/RBDS block 182 reports relevant RDS/RBDS data from RDS/RBDS decoder 158 in processing circuitry 108 through control interface 186. A receive signal strength indicator block (RSSI) 184 analyzes the received signal and reports data concerning the strength of the signal through control interface 186. In other embodiments, other communication interfaces may be used, if desired, including serial or parallel interfaces that use synchronous or asynchronous communication protocols.

An external oscillator 176, operating, for example, at 32.768 kHz, provides a fixed reference clock signal to a tune block 174 through an RCLK connection. Tune block 174 also receives a DCLK signal 178. Tune block 174 generates a reference frequency and provides the reference frequency to a frequency synthesizer 172. An automatic frequency control (AFC) block 170 receives a tuning error signal from the receive path circuitry within receiver 100C and provide a correction control signal to frequency synthesizer 172.

Frequency synthesizer 172 receives the reference frequency from tuning block 174 and the correction control signal from AFC block 170. Frequency synthesizer 172 generates two mixing signals that are 90 degrees out of phase with each other and provides the mixing signals to mixers 104A and 104B as signals 118A and 118B, respectively.

In other embodiments, receivers 100A, 100B, and 100C may be combined with transmitter circuitry to form transceivers 100A, 100B, and 100C.

Figure 6:
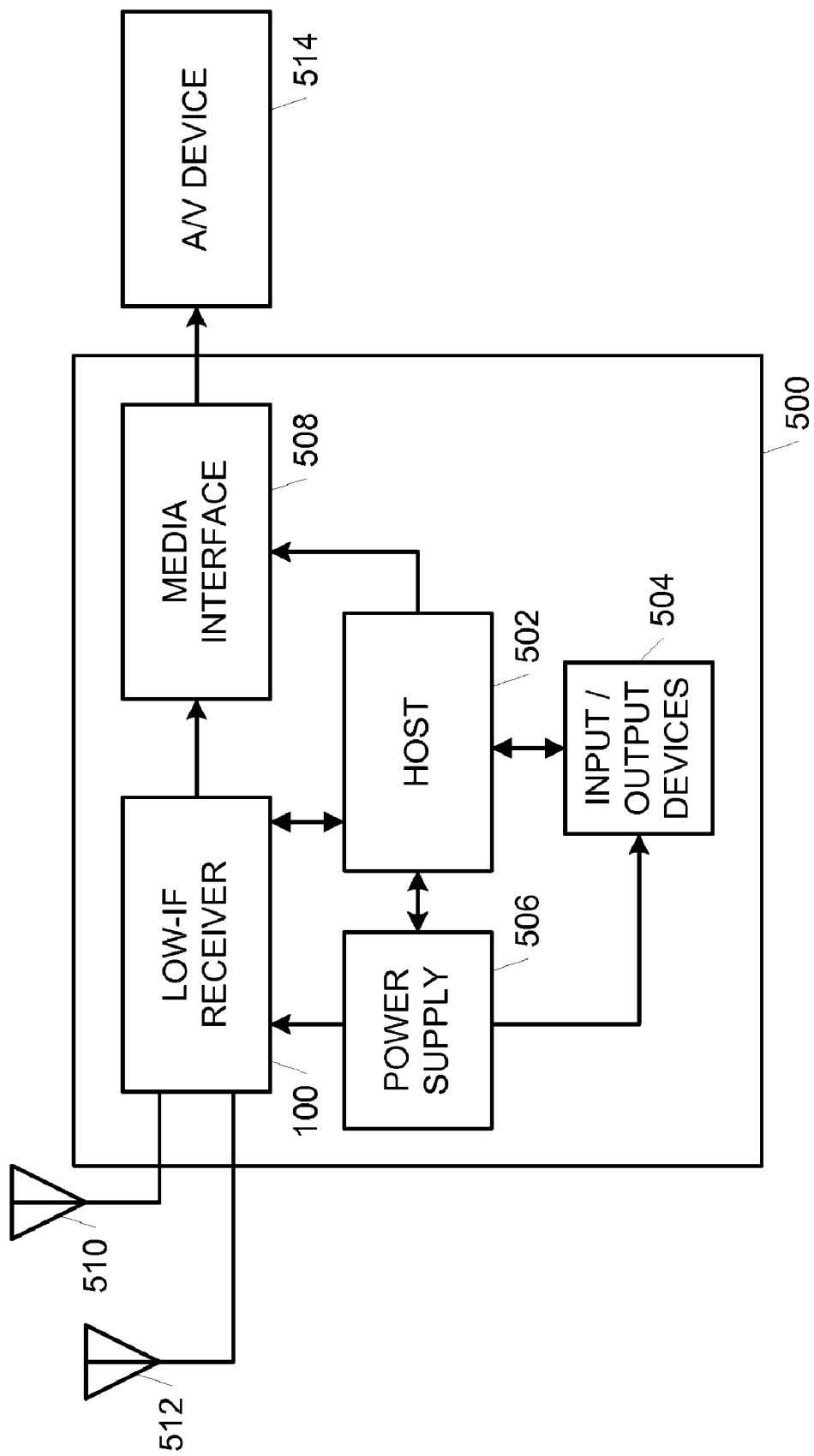
FIG. 6 is a block diagram illustrating one embodiment of a device that includes a low-IF receiver.

FIG. 6 is a block diagram illustrating one embodiment of a device 500 that includes low-IF receiver 100. Device 500 may be any type of portable or non-portable electronic device such as a mobile or cellular telephone, a personal digital assistant (PDA), an audio and/or video player (e.g., an MP3 or DVD player), an audio and/or video system (e.g., a television or stereo system), a wireless telephone, a desktop or laptop computer, or a peripheral card (e.g., a USB card) that couples to a computer. Device 500 includes low-IF receiver 100, a host 502, one or more input/output devices 504, a power supply 506, a media interface 508, an FM antenna 510, an AM antenna 512, and an audio/video (A/V) device 514, among other components.

Low-IF receiver 100 receives broadcast signals using antenna 510 and antenna 512, processes the signals as described above, provides digital audio signals to host 502, and provides analog audio signals to audio output interface 508. Low-IF receiver 100 selects a broadcast channel in response to channel selection inputs from host 502.

Host 502 provides channel selection inputs and other control inputs to low-IF receiver 100. Host 502 receives the digital audio signals from low-IF receiver 100, processes the digital audio signals, and provides the processed signals in a digital or audio format to media interface 508. Host 502 may provide control inputs to media interface 508 to select the audio signals that are output by media interface 508. Host 502 also receives RDS/RBDS data from receiver 100 and provides the RDS/RBDS data to input/output devices 504. Host 502 may also provide visual information to media interface 508 for display to a user.

Input/output devices 504 receive information from a user and provide the information to host 502. Input/output devices 504 also receive information from host 502 and provide the information to a user. The information may include RDS/RBDS data, channel selection information, voice and/or data communications, audio, video, image, or other graphical information. Input/output devices 504 include any number and types of input and/or output devices to allow a user provide information to and receive information from device 500. Examples of input and output devices include a microphone, a speaker, a keypad, a pointing or selecting device, and a display device.

Power supply 506 provides power to low-IF receiver 100, host 502, input/output devices 504, and media interface 508. Power supply 506 includes any suitable portable or non-portable power supply such as a battery or an AC plug.

Media interface 508 provides at least one digital or analog audio signal stream to A/V device 514. A/V device 514 broadcasts the audio signal to a user. A/V device 514 may be any suitable audio broadcast device such as headphones or speakers. A/V device 514 may also include an amplifier or other audio signal processing devices. A/V device 514 may further include any suitable video device configured to display information from host.

In the above embodiments, processing circuitry 108 includes hardware, software, firmware, or a combination of these. In one embodiment, components of processing circuitry 108, such as RDS/RBDS decoder 158, may form a program product with instructions that are accessible to and executable by processing circuitry 108 to perform the functions of processing circuitry described above. The program product may be stored in any suitable storage media that is readable by processing circuitry 108. The storage media may be within or external to processing circuitry 108.

In the above embodiments, at least LO generation circuitry 130, mixer 104, low-IF conversion circuitry 106 and processing circuitry 108 may be located on-chip and integrated on the same integrated circuit (i.e., on a single chip that is formed on a common substrate). In addition, any of LNA 102, LNA 102A, and LNA 102B and other desired circuitry may also be integrated into the same integrated circuit. An antenna that couples to LNAs 102, 102A, or 102B (such as antennas 111 and 115 in FIG. 1C or antennas 510 and 512 in FIG. 6) may be located off-chip (i.e., external to the common substrate that includes receiver 100). In other embodiments, other components of receiver 100 may be located off-chip.

In the above embodiments, a variety of circuit and process technologies and materials may be used to implement the receivers described above. Examples of such technologies include metal oxide semiconductor (MOS), p-type MOS (PMOS), n-type MOS (NMOS), complementary MOS (CMOS), silicon-germanium (SiGe), gallium-arsenide (GaAs), silicon-on-insulator (SOI), bipolar junction transistors (BJTs), and a combination of BJTs and CMOS (BiCMOS).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:
   receiving hard decode values for an RDS/RBDS (Radio Data System/Radio Broadcast Data System) input signal, each of the hard decode values being generated from a corresponding pair of symbols from the RDS/RBDS input signal;
   receiving filtered decode values for the RDS/RBDS input signal, each filtered decode value being generated from combined values from each of at least two groups of RDS/RBDS data in the RDS/RBDS input signal;
   identifying a plurality of reliable filtered decode values within the filtered decode values using the combined values;

including the plurality of reliable filtered decode values in a first portion of an RDS/RBDS data group for an RDS/RBDS output signal in place of corresponding hard decode values;

including a first plurality of hard decode values in a second portion of the RDS/RBDS data group, the first plurality of hard decode values being a portion of the received hard decode values;

preventing an error correction code (ECC) unit from modifying the plurality of reliable filtered decode values in the RDS/RBDS data group; and allowing the ECC unit to modify the first plurality of hard decode values in the RDS/RBDS data group.

2. The method of claim 1 further comprising:
including a second plurality of hard decode values in the RDS/RBDS data group, the second plurality of hard decode values being a portion of the received hard decode values; and preventing the error correction code unit from modifying the second plurality of hard decode values.

3. The method of claim 1 further comprising:
detecting that one of the first plurality of hard decode values that is adjacent to a first one of the plurality of reliable filtered decode values is incorrect;

including a corrected value in place of the one of the first plurality of hard decode values in the RDS/RBDS data group; and preventing the error correction code unit from modifying the one of the first plurality of hard decode values.

4. The method of claim 3 further comprising:
detecting that the one of the first plurality of hard decode values is incorrect by detecting that one of a pair of symbols corresponding to the one of the first plurality of hard decode values is unreliable.

5. The method of claim 3 further comprising:
detecting that the one of the first plurality of hard decode values is incorrect by comparing the first one and a second one of the plurality of reliable filtered decode values to corresponding first and second ones of a second plurality of hard decode values.

6. The method of claim 1 wherein the plurality of reliable filtered decode values corresponds to at least a portion of one of a block A information word or a block B information word in the RDS/RBDS data group.

7. The method of claim 1 further comprising:
identifying the plurality of reliable filtered decode values in a set of combined values, wherein each of the reliable filtered decode values approaches one of a set of known values over time.

8. The method of claim 7 further comprising:
storing the set of combined values in a circular buffer.

9. The method of claim 1 further comprising:
receiving a broadcast channel that includes the RDS/RBDS input signal.

10. A program product comprising:
a program executable by processing circuitry for causing the processing circuitry to:
receive hard decode values for an RDS/RBDS (Radio Data System/Radio Broadcast Data System) input signal, each of the hard decode values being generated from a corresponding pair of symbols from the RDS/RBDS input signal;
receive filtered decode values for the RDS/RBDS input signal, each filtered decode value being generated from combined values from each of at least two groups of RDS/RBDS data in the RDS/RBDS input signal;

identify a plurality of reliable filtered decode values within the filtered decode values using the combined values;
include the plurality of reliable filtered decode values in a first portion of an RDS/RBDS data group for an RDS/RBDS output signal in place of corresponding hard decode values;
include a first plurality of hard decode values in a second portion of the RDS/RBDS data group, the first plurality of hard decode values being a portion of the received hard decode values;
prevent an error correction code (ECC) unit from modifying the plurality of reliable filtered decode values in the RDS/RBDS data group; and
allow the ECC unit to modify the first plurality of hard decode values in the RDS/RBDS data group; and
a non-transitory medium that stores the program so that the program is accessible by the processing circuitry.

11. The program product of claim 10 wherein the program is executable by the processing circuitry for causing the processing circuitry to:
include a second plurality of hard decode values in the RDS/RBDS data group, the second plurality of hard decode values being a portion of the received hard decode values; and
prevent the error correction code unit from modifying the second plurality of hard decode values.

12. The program product of claim 10 wherein the program is executable by the processing circuitry for causing the processing circuitry to:
detect that one of the first plurality of hard decode values that is adjacent to a first one of the plurality of reliable filtered decode values is incorrect;
include a corrected value in place of the one of the first plurality of hard decode values in the RDS/RBDS data group; and
prevent the error correction code unit from modifying the one of the first plurality of hard decode values.

13. The program product of claim 10 wherein the plurality of reliable filtered decode values corresponds to at least a portion of one of a program identifier (PI) code, traffic program (TP) code, or a program type (PTY) code in the RDS/RBDS data group.

14. The program product of claim 10 wherein the program is executable by the processing circuitry for causing the processing circuitry to:
identify the plurality of reliable filtered decode values in a set of combined values, wherein each of the reliable filtered decode values approaches one of a set of known values over time.

15. The program product of claim 14 wherein the program is executable by the processing circuitry for causing the processing circuitry to:
store the set of combined values in a circular buffer.

16. A system comprising:
a receiver configured to:
receive hard decode values for an RDS/RBDS (Radio Data System/Radio Broadcast Data System) input signal, each of the hard decode values being generated from a corresponding pair of symbols from the RDS/RBDS input signal;
receive filtered decode values for the RDS/RBDS input signal, each filtered decode value being generated from combined values from each of at least two groups of RDS/RBDS data in the RDS/RBDS input signal;

identify a plurality of reliable filtered decode values within the filtered decode values using the combined values;

include the plurality of reliable filtered decode values in a first portion of an RDS/RBDS data group for an RDS/RBDS output signal in place of corresponding hard decode values;

include a first plurality of hard decode values in a second portion of the RDS/RBDS data group, the first plurality of hard decode values being a portion of the received hard decode values;

prevent an error correction code (ECC) unit from modifying the plurality of reliable filtered decode values in the RDS/RBDS data group; and allow the ECC unit to modify the first plurality of hard decode values in the RDS/RBDS data group; and a host coupled to the receiver;

wherein the receiver is configured to provide the RDS/RBDS output signal to the host.

17. The system of claim 16 further comprising:

an input/output device configured to provide a channel selection to the receiver that identifies a broadcast channel that includes the RDS/RBDS input signal.

18. The system of claim 16 wherein the receiver is configured to:

include a second plurality of hard decode values in the RDS/RBDS data group, the second plurality of hard decode values being a portion of the received hard decode values; and prevent the error correction code unit from modifying the second plurality of hard decode values.

19. The system of claim 16 wherein the receiver is configured to:

detect that one of the first plurality of hard decode values that is adjacent to a first one of the plurality of reliable filtered decode values is incorrect;

include a corrected value in place of the one of the first plurality of hard decode values in the RDS/RBDS data group; and prevent the error correction code unit from modifying the one of the first plurality of hard decode values.

20. The system of claim 16 wherein the receiver is configured to:

identify the plurality of reliable filtered decode values in a set of combined values, wherein each of the reliable filtered decode values approaches one of a set of known values over time.

* * * * *